(12) United States Patent
Rubel (10) Patent No.: US 6,412,145 B1
(45) Date of Patent: Jul. 2, 2002

(54) DOOR HANDLE COVER (76) Inventor: Richard J. Rubel, 643 Waterloo St., Columbus, WI (US) 53925

( * ) Notice: Subject to any disclaimer, the term of this patent is extended or adjusted under 35 U.S.C. 154(b) by 0 days.

(21) Appl. No.: 09/632,473

(22) Filed: Aug. 4, 2000

(51) Int. Cl.[7] .............................. B62B 7/00; B25G 3/00
(52) U.S. Cl. ........................ 16/412; 16/110.1; 16/435; 292/DIG. 31
(58) Field of Search ..................... 16/412, 422, 110.1, 16/435; 292/DIG. 31, DIG. 32, 347, 336.3, DIG. 63; 296/146.1, 71; D12/190; D8/302–305

(56) References Cited

U.S. PATENT DOCUMENTS

| 2,636,209 A | | 4/1953 | Tedder |
| 2,675,576 A | | 4/1954 | Nalevanko |
| 2,683,889 A | | 7/1954 | Kanocz |
| 2,733,474 A | | 2/1956 | Capitani |
| 2,999,523 A | | 9/1961 | Amdur et al. |
| 4,342,136 A | | 8/1982 | Okabe et al. |
| 4,803,755 A | * | 2/1989 | Pohlman ...................... 16/431 |
| 4,823,434 A | | 4/1989 | Inagaki et al. |
| 5,221,135 A | * | 6/1993 | Nakamura ................. 16/110.1 |
| 5,647,248 A | * | 7/1997 | Silsby, Jr. ............... 292/DIG. 2 |
| 5,740,587 A | * | 4/1998 | Onai et al. ..................... 16/412 |
| 5,943,737 A | | 8/1999 | Tomimitsu et al. |
| 5,983,682 A | * | 11/1999 | Parikh ................. 292/DIG. 31 |
| 5,985,382 A | | 11/1999 | Shuen |

* cited by examiner

Primary Examiner—Chuck Y. Mah
(74) Attorney, Agent, or Firm—Lathrop & Clark LLP (57) ABSTRACT A semi-truck door latch handle cover has a rear plate which is positioned rearwardly of and connected to a front plate by a curved connector segment. The cover may have a lip extending rearwardly from the front plate along an edge opposite the connector segment. The front plate is thus positionable to overlie the vehicle latch handle with the lip engaged with the latch handle, and the rear plate positioned rearwardly of the vehicle latch handle, the cover being sufficiently resilient as to permit temporary deformation when the cover is attached to the latch handle. The rear plate may have vertically extending wings which contribute to the positioning of the cover with respect to latch flanges. The lip may extend around three sides of the front plate. Alternatively, a cover without a lip may have a resilient clip extending form the rear plate which connects to a latch axle pin.

23 Claims, 6 Drawing Sheets

DOOR HANDLE COVER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to truck latch handles in general, and to decorative covers for truck latch handles in particular.

The modern semi truck is a refined master of the road. Combining vast load-hauling power, fuel efficient aerodynamics, and driver comfort, these trucks spread across country carrying all types of loads in all weather. Whether as employees operating one vehicle of a corporate fleet, or as owner operators, the drivers of semis are skilled operators of complicated machines who are acquainted with the many aspects of the truck, and often take personal pride in the vehicle's appearance and performance.

These trucks are offered by the manufacturers with a number of factory options which enable the purchaser to configure the vehicle to suit his desires. However, due to economies of scale, the number of factory options is by necessity limited. Hence, the discerning truck operator will seek out attractive accessories to configure the appearance of his vehicle in a distinctive and pleasing fashion.

The door latch of a truck is a focal point of operator and spectator attention, and, due to its frequent use, is generally not painted, but finished with chrome plating or other brightwork. What is needed is a truck accessory which provides a simple and economical modification to a latch handle which permits an operator to nondestructively modify the appearance of his vehicle.

SUMMARY OF THE INVENTION

The vehicle door latch handle cover of this invention is fabricated from a bendable metal, such as brass, and has a front plate which has a side to side first width. A rear plate is positioned rearwardly of and connected to the front plate by a curved connector segment. In one embodiment, the rear plate has a side to side second width which is less than the first width. A lip extends rearwardly from the front plate along an edge spaced from the connector segment. The front plate is positionable to overlie the vehicle latch handle with the lip engaged with the latch handle, and the rear plate positioned rearwardly of the vehicle latch handle, the cover being sufficiently resilient as to permit temporary deformation when the cover is attached to the latch handle. The rear plate may have upwardly and downwardly extending wings which contribute to the positioning of the cover with respect to latch flanges. Moreover, the cover may have upper and lower lip elements which contribute to the positioning of the cover over the latch. Alternatively, the cover may have a resilient clip which attaches to the latch handle axle pin.

It is an object of the present invention to provide a cover for a vehicle latch handle that is easily attachable.

It is another object of the present invention to provide a cover for a vehicle latch handle which can be removed without damage to the door handle.

It is also an object of the present invention to provide a cover for a vehicle latch handle which securely attaches to the handle without interfering with handle operation.

It is an additional object of the present invention to provide a decorative cover for the latch handle of a semi truck.

Further objects, features and advantages of the invention will be apparent from the following detailed description when taken in conjunction with the accompanying drawings.

DESCRIPTION OF THE PREFERRED EMBODIMENTS

Figure 1:
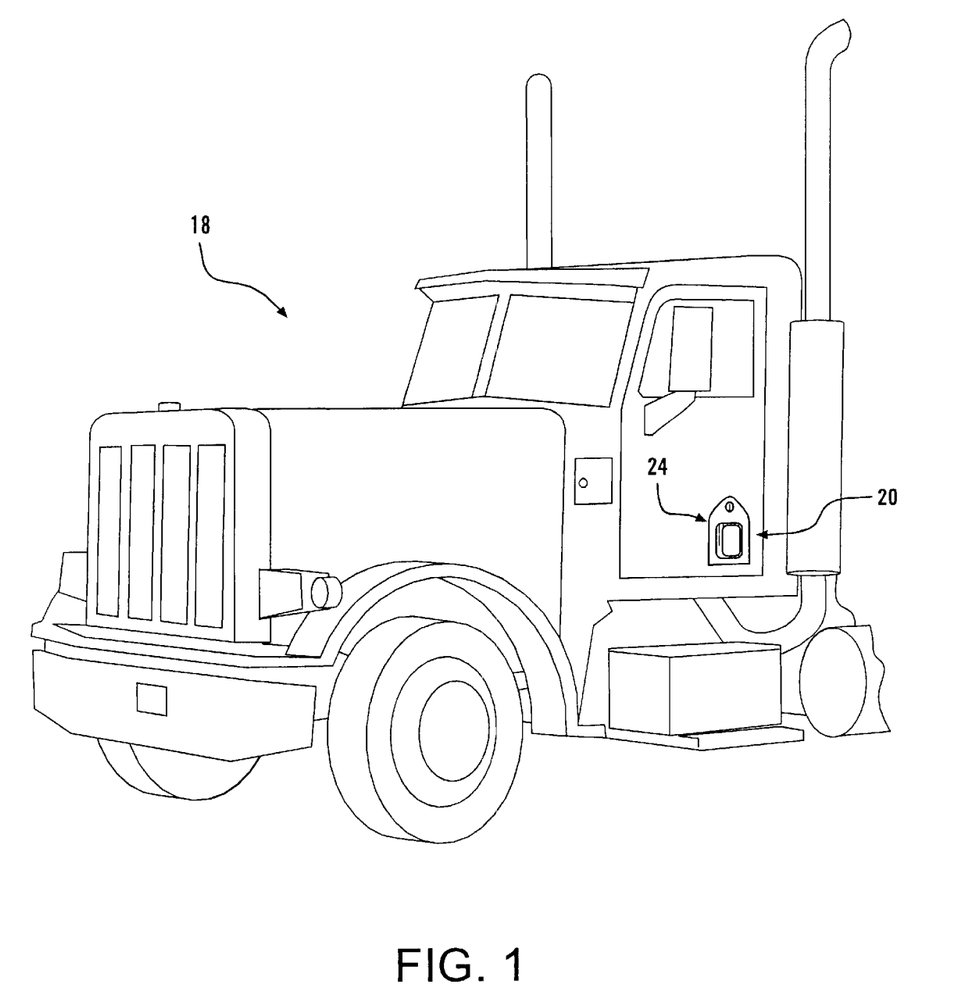
FIG. 1 is a fragmentary perspective view of a semi-truck having a vehicle door latch handle outfitted with the decorative cover of this invention.
Figure 2:
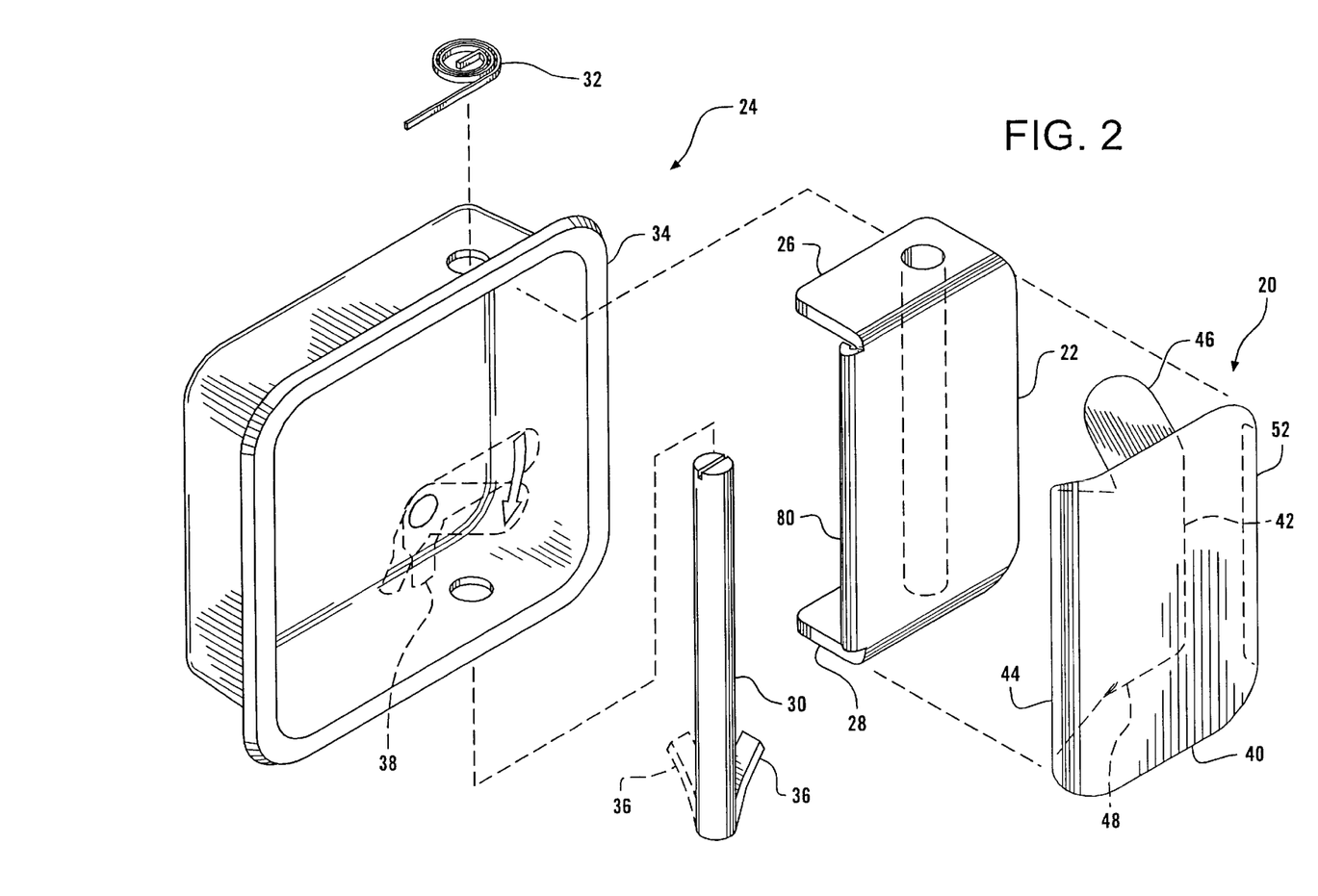
FIG. 2 is an exploded isometric view of a cover of this invention shown in relation to a door latch and handle.
Figure 3:
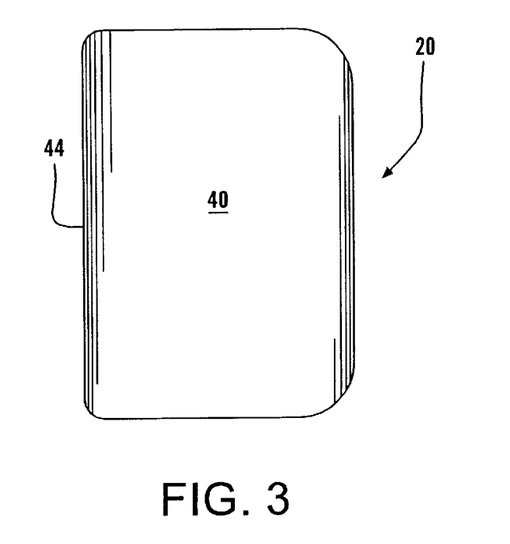
FIG. 3 is a front elevational view of the decorative cover of FIG. 1.

Referring more particularly to FIGS. 1–16, wherein like numbers refer to similar parts, a semi truck 18 is shown in FIG. 1 having a door latch handle cover 20 of this invention attached to a door latch handle 22 in a latch assembly 24. Semi truck door latch handles 22 may take on various configurations for different models of trucks manufactured by different manufacturers. However, most configurations feature a latch handle 22, as shown in FIG. 2, which is formed from a steel stamping which is painted, enameled, or chrome plated. The latch handle 22 has an upper flange 26 and a lower flange 28 through which an axle pin 30 extends vertically and is fixed to the handle. Some type of spring, for example a coil spring 32, is connected between the axle 30 and the latch housing 34 of the door latch assembly 24. The axle pin 30 has a protruding camming arm 36 at its lower end which engages a latch member 38 such that rotation of the handle 22 about the axle 30 causes the latch member to disengage from a striker located on the semi truck body. The dimensions and mechanisms of semi truck latch assemblies may vary, but will consistently have the rotatable handle 22 within a housing 34.

The axle or hinge pin extends upwardly and downwardly through the housing to mount the handle for rotation on the housing. A portion of the hinge pin which extends through the housing has a camming arm mounted thereto for actuating a door opening mechanism. The latch is opened by reaching behind the handle and swinging it outwardly. In a first type of cover, the latch handle cover meets several conditions in order to be held fixedly to the latch. It wraps around three sides of the latch: the hinge edge of the handle on one side facing the housing, the front surface of the handle, and the handle edge opposite the hinge edge. However, in this type of cover, in order to avoid the cover being removed during operation of the latch, the latch cover must extend behind the handle to cover the entire operating surface of the handle. The operating surface of the handle is that portion of the back surface where force to open the latch is applied. If the latch cover does not extend over the operating surface, the user's fingers which drag across the operating surface when the latch is opened would have a tendency to remove the latch cover.

Figure 4:
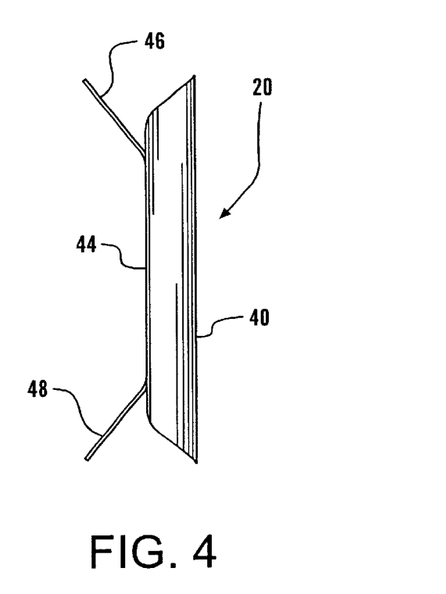
FIG. 4 is a left side elevational view of the cover of FIG. 2.
Figure 5:
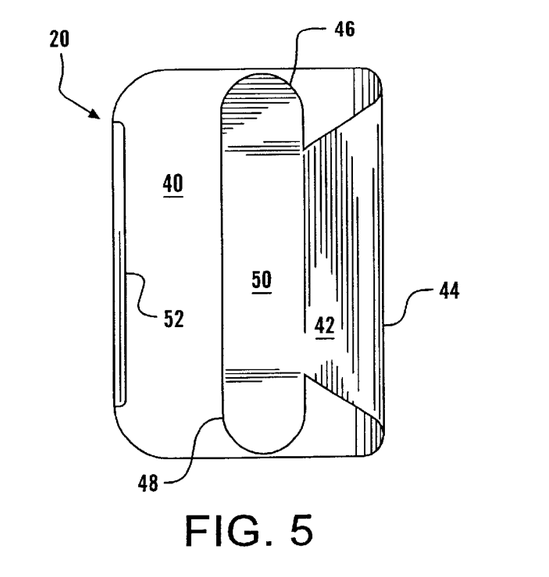
FIG. 5 is a rear elevational view of the cover of FIG. 2.

The latch handle cover 20 is formed from cut and bent sheet metal selected for its ornamental appearance properties. In a preferred embodiment the cover 20 is formed of 0.032 inch thick brass sheet. Although other materials may be employed, the attachment of the cover 20 to the handle 22 relies on the elastic deformation or resilience of the metal used. The unitary cover 20, as shown in FIGS. 2–6, is formed from a single piece of sheet metal and has a generally rectangular front plate 40 which overlies the latch handle 22. A rear plate 42 is positioned rearwardly of the front plate 40, and has a side to side width which is less than the front plate. The rear plate 42 is connected to the front plate 40 by a curved connector segment 44, best shown in FIGS. 4 and 6. When used with a latch handle 22 having rearwardly extending flanges 26, 28, the cover 20 is preferably provided with a top wing 46 which extends upwardly from the rear plate 42, and a bottom wing 48 which extends downwardly from the rear plate. As shown in FIG. 4, the wings 46, 48 are angled at about 45 degrees from a center segment 50 of the rear plate, so that they extend rearwardly as well as upwardly or downwardly. The connector segment 44 and rear plate 42 taper, as shown in FIG. 5, as they extend toward the wings 46, 48. The wings 46, 48 serve to resiliently position the rear plate within the latch handle 22 between the flanges 26, 28.

Figure 6:
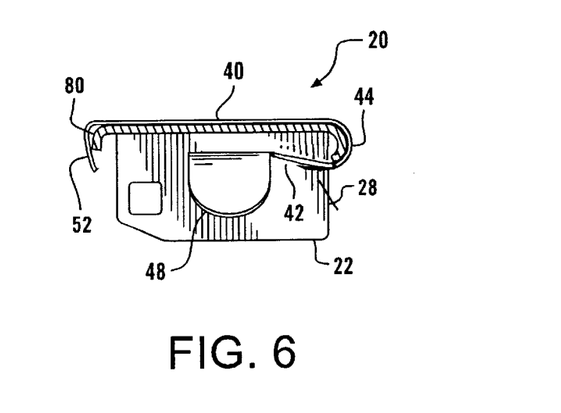
FIG. 6 is a top plan view of the cover of FIG. 2.
Figure 7:
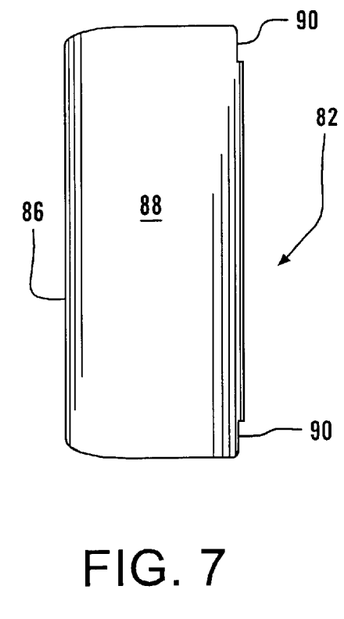
FIG. 7 is a front elevational view of an alternative embodiment vehicle door latch handle cover of this invention.
Figure 8:
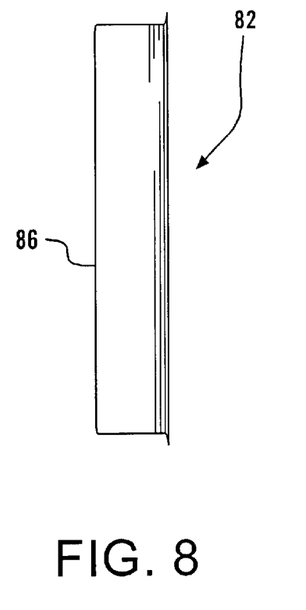
FIG. 8 is a left side elevational view of the cover of FIG. 6.
Figure 9:
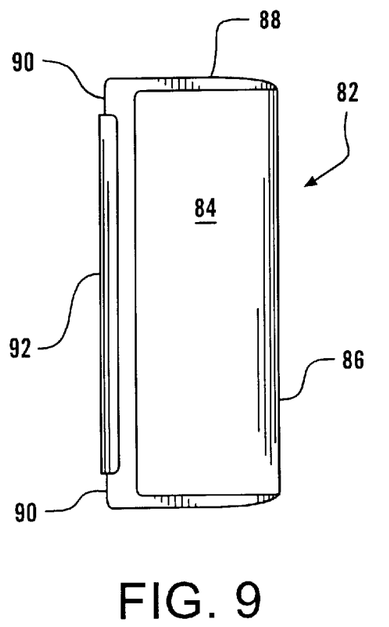
FIG. 9 is a rear elevational view of the cover of FIG. 6.
Figure 10:
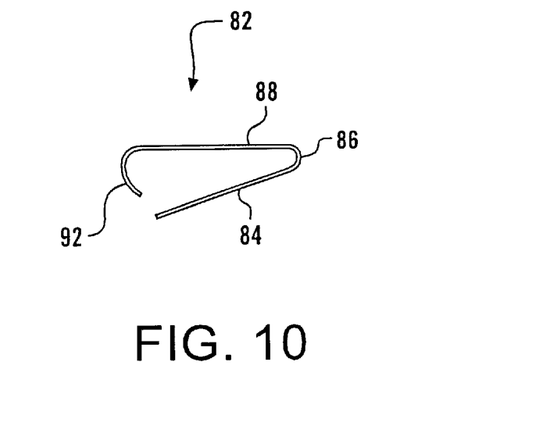
FIG. 10 is a top plan view of the cover of FIG. 6.

The front plate 40 has a lip or side element 52 which extends from an edge of the front plate which is parallel to the connector segment 44. The side element 52 is about ⅜ inch wide, and extends rearwardly and inwardly toward the connector segment, as shown in FIG. 6.

As shown in FIG. 2, the cover 20 is dimensioned to be assembled on a particular make of door latch handle. Installation of the cover 20 requires no tools, and does not require any permanent or non-reversible change to the manufacturer's original equipment. The cover 20 is positioned alongside the latch handle 22, and the rear plate 42 is positioned rearward of the handle. The front plate 40 passes over the front of the handle 22 until the cover side element 52 passes over the side edge 80 of the handle, as shown in FIG. 6. The edge 80 is usually radiused, which provides cam action to bend the side 80 outwardly as it is pressed into place. Once in place, the side element returns to its original orientation with respect to the cover front plate 40. The side element 52, which is inclined, then locks the cover 20 to the handle 22. The latch handle 22 is then engaged between the cover side element 52 and the connector segment 44 in the side to side direction. Top to bottom direction movement is restricted by the engagement of the wings 46, 48 within the handle flanges 26, 28.

Once installed the cover 20 is securely in place, and is difficult to remove without a tool, thereby reducing the likelihood that the cover could be removed inadvertently due to vibrations or shock, or by theft. To remove the cover 20, a sharp implement, such as a hook tool, can be inserted between the front of the handle 22 and the cover front plate 40, in the vicinity of the side element 52, and pivoted to free the side element from its engagement with the handle. Once the side element 52 is released, the cover 20 may be pivoted about the connector segment, and removed from the handle. The cover 20 is suited for door latches of many Kenworth and Peterbilt trucks.

Because the cover is readily removable, it may be installed by a driver on a particular truck, and then removed if the driver acquires a new truck or is reassigned. The cover does not need to be fastened to the door latch handle with any penetrating fasteners.

Two alternative embodiment covers are shown in FIGS. 7–12, which are adapted for other latch handle configurations. The cover 82 shown in FIGS. 7–10 has a rear plate 84 with no wings. The rear plate 84 extends from a connector segment 86. The side element 92 is of a height that is less than the height of the front plate 88. The cut-aways 90 at the connection between the side element 92 and the front plate 88 provide additional clearance around the door handle in situations where the fit between the door handle 22 and the housing 34 is tight. Such a cover is suited for many door latches on Pacar Corporation trucks.

Figure 11:
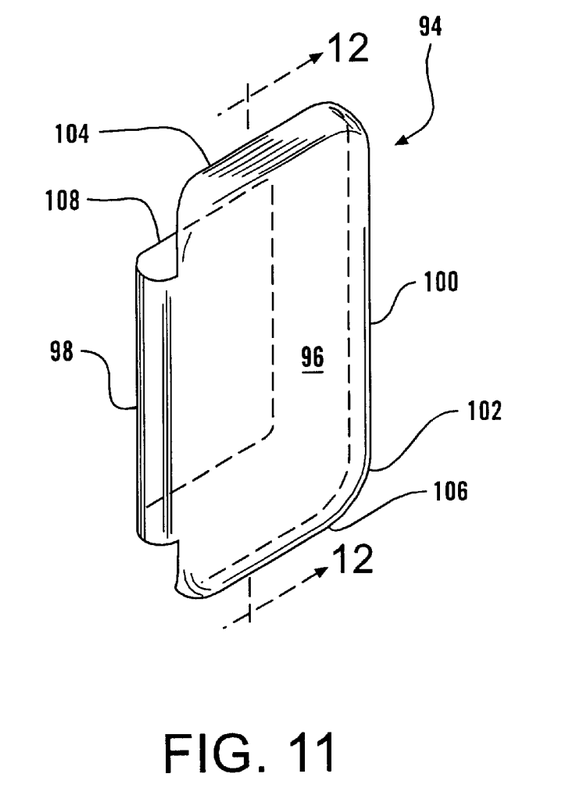
FIG. 11 is an isometric view of an alternative embodiment vehicle door latch handle cover of this invention.
Figure 12:
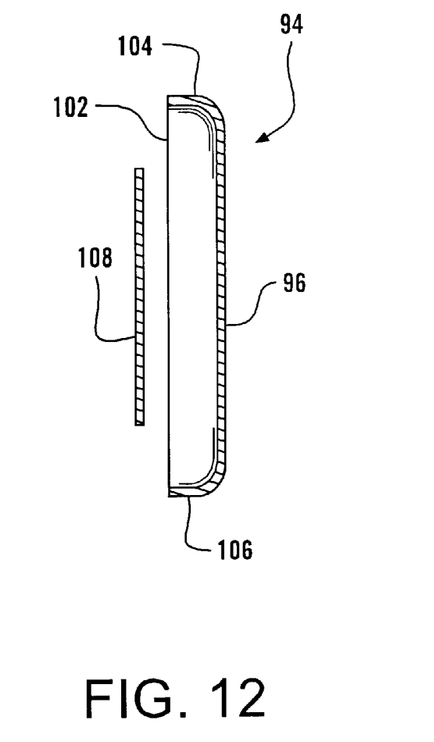
FIG. 12 is a cross-sectional view of the door latch handle cover of FIG. 11.

The cover 94 shown in FIGS. 11 and 12 has a front plate 96 with a connector segment 98 which is of a height that is less than the height of the front plate. The rear plate 108 extends from the connector segment 98. The cover 94 has a side element 100 which is part of a continuous lip 102 which encircles three sides of the front plate 96. The lip 102 includes an upper element 104 and a lower element 106 which restrict vertical movement of the cover 94 with respect to the handle to which it is attached. Such a cover is suited for many door latches on Pacar Corporation trucks.

Alternative latch handle covers are illustrated in FIGS. 13–16 which use a resilient clip structure which engages with the handle axle pin 30 rearward of the door latch handle 22. Such covers have the advantage that they are adaptable to mounting on a wider variety of door handle shapes. The latch handle cover 120, shown in FIGS. 13 and 14, as with the covers disclosed above, is formed from cut and bent sheet metal such as brass. The unitary cover 120 is formed from a single piece of sheet metal having a generally rectangular front plate 140 which overlies the latch handle 22. A rear plate 142 is positioned rearwardly of the front plate 140. The rear plate 142 is connected to the front plate 140 by a curved connector segment 144. The cover 120 has a top wing 146 which extends upwardly from the a center segment 150 of the rear plate 142, and a bottom wing 148 which extends downwardly from the rear plate, to engage with rearwardly extending flanges 128 on the handle.

Figure 13:
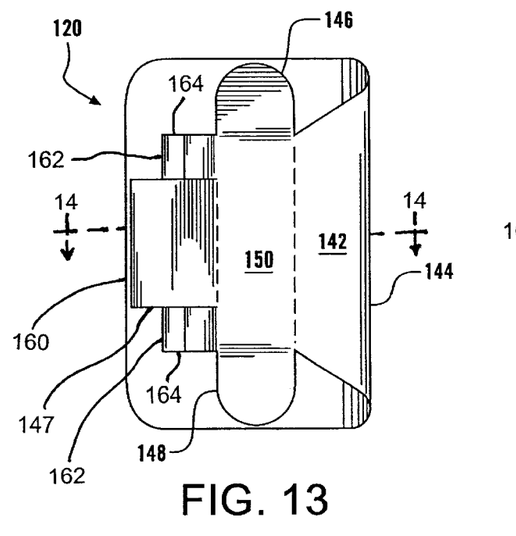
FIG. 13 is a rear elevational view of an alternative embodiment latch handle cover of this invention having a rear clip.
Figure 14:
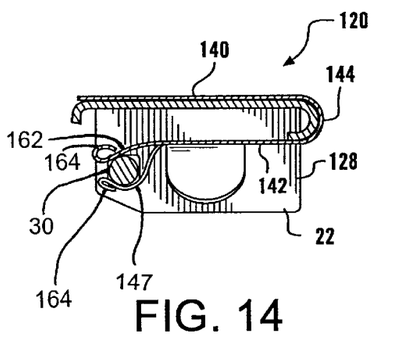
FIG. 14 is a cross-sectional view of the latch handle cover of FIG. 13, taken along section line 14—14 and shown in position on a latch handle.

The cover 120 has a resilient clip 147 which extends from the center segment 150 of the rear plate 142 and which is positioned to engage the cylindrical axle pin 30 when positioned on the latch handle 22. The clip 147 has a wide center tab 160, with two adjacent side tabs 162. The tabs 160, 162 are formed with a curvature such that the curvature of the center tab is opposite to the curvature of the side tabs; i.e., as shown in FIG. 14, so that the center tab 160 opens rearwardly, and the side tabs open frontwardly. Each tab 160, 162 has an entry element 164, which is a narrow strip of metal folded back and away from the location of the axle pin. The entry elements 164 provide a curved cam like surface which assists the entry of the axle pin 30 between the center tab 160 and the side tabs 162 when the cover 120 is attached to the latch handle 22. The rear plate 142 may extend parallel to the front plate 240. Or, if additional spring force is required, the rear plate 142 may extend at an angle or have its spacing from the front plate adjusted.

Installation of the cover 120 requires no tools, requiring the user to simply slide the rear plate behind the latch handle 22, and the front plate 140 in front of the door handle. The clip 147 on the rear plate 142 engages the axle pin 30 and secures the cover 120 to the handle 22. The clip 147 prevents the side to side movement of the cover, wings 146, 148 prevent its up and down movement, and the engagement of the front plate with the front surface of the handle restricts rotation of the cover about the axle pin 30. To remove the cover 120, a pointed instrument can be introduced between the curved connector segment 144 and the door handle, and pressure applied to pull the clip out of engagement with the axle pin 30.

The front plate 140 is selected of dimensions such that, although a majority of the latch handle is covered, it need not necessarily entirely cover the latch handle. Thus a variety of latch handles produced by different manufacturers can be accommodate by a single latch handle cover part. Furthermore, because the part is symmetrical about a horizontal side to side axis, the same part can be applied to right-handed and left-handed latch handles.

Figure 15:
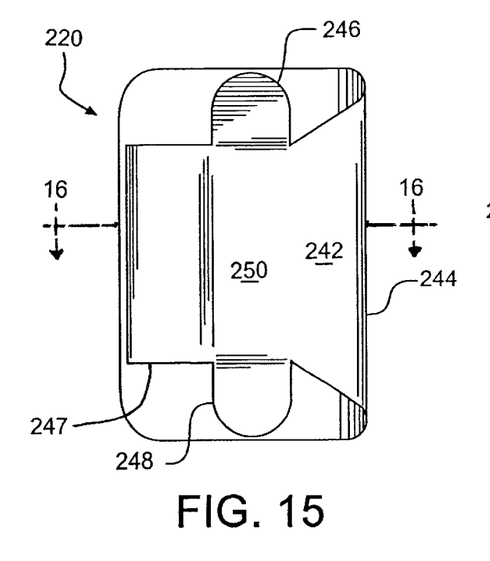
FIG. 15 is a rear elevational view of another alternative embodiment latch handle cover of this invention having a rear clip.
Figure 16:
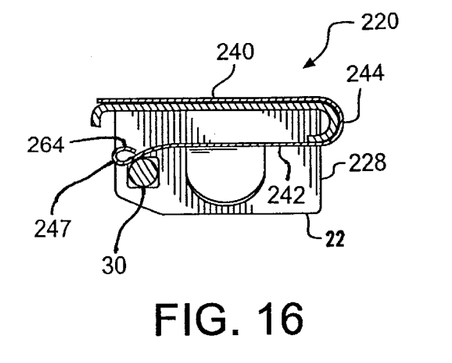
FIG. 16 is a cross-sectional view of the latch handle cover of FIG. 15, taken along section line 16—16 and shown in position on a latch handle.

The cover 220, shown in FIGS. 15 and 16 has a different clip 247, which in some instances will more readily be attached to a latch handle. The cover 220 has a front plate 240, connected by a curved connector segment 244 to a rear plate 242 having a center segment 250 from which a top wing 246 and a bottom wing 248 extend. The wings 246, 248 may engage against rearwardly extending flanges 228 of the handle 22. The clip 247 is a single rearwardly opening concave tab 260 which is terminated by a folded entry element 264. The tab 260 is formed such that it, in its undeflected condition, it would intersect with the axle pin 30. When the cover 220 is attached to the handle 22, the tab 260 rides up frontwardly of the pin, and exerts a retaining force on the pin 30, holding the cover in place. Removal of the cover 220 is in the fashion discussed with respect to the cover 120. The covers 120, 220 are suited, for example, for many door latches on Mack, Western Star and Ford Trucks.

As shown in the table below, the covers of this invention may be employed with a variety of common door latch handles.

| Door latch handle manufacturer's part number | latch cover call-out number |
|---|---|
| Kenworth 35833-000 | 20, 120, 220 |
| Kenworth K294-411 | 82 |
| Kenworth OHLA 04 | 94 |
| Peterbilt 20-01079-L | 20, 120, 220 |

-continued

| Door latch handle manufacturer's part number | latch cover call-out number |
|---|---|
| Peterbilt OHLA-04 | 94 |
| Mack 20QX42M | 120, 220 |

It should be noted that the cover of this invention provides many decorative opportunities for customizing a semi truck door handle. In addition to plain brass, the sheet metal from which the cover is formed may be decorated with cloisonne, with engraving, or with embossing.

It is understood that the invention is not limited to the particular construction and arrangement of parts herein illustrated and described, but embraces such modified forms thereof as come within the scope of the following claims.

I claim:

1. A cover for a vehicle latch handle comprising:
   a front plate having a side to side first width;
   a rear plate positioned rearwardly of the front plate and connected thereto by a connector segment which extends rearwardly from the front plate, the rear plate having a side to side second width which is less than the first width; and
   a lip which extends rearwardly from the front plate along an edge spaced from the connector segment, wherein the front plate is positionable to overlie the vehicle latch handle with the lip engaged with the latch handle, and the rear plate extends toward the lip the second width, and is positioned rearwardly of the vehicle latch handle, the cover being sufficiently resilient as to permit temporary deformation when the cover is attached to the latch handle.

2. The cover of claim 1 wherein the lip includes a side element which extends generally parallel to the connector segment.

3. The cover of claim 2 wherein the front plate has an upper edge and a generally parallel lower edge, and wherein the vertical height of the side element of the lip is less than the vertical distance between the front plate upper edge and the front plate lower edge.

4. The cover of claim 2 wherein the lip includes a top element extending rearwardly from the front plate and a bottom element extending rearwardly from the front plate.

5. A cover for a vehicle latch handle comprising:
   a front plate having a side to side first width;
   a rear plate positioned rearwardly of the front plate and connected thereto by a connector segment, the rear plate having a side to side second width which is less than the first width; and
   a lip which extends rearwardly from the front plate along an edge spaced from the connector segment, wherein the front plate is positionable to overlie the vehicle latch handle with the lip engaged with the latch handle, and the rear plate positioned rearwardly of the vehicle latch handle, the cover being sufficiently resilient as to permit temporary deformation when the cover is attached to the latch handle, wherein the rear plate comprises:
   a center segment having an upper edge and a lower edge;
   a top wing extending upwardly and rearwardly from the upper edge; and
   a bottom wing extending downwardly and rearwardly from the lower edge, the top wing and the bottom wing acting to engage rearwardly extending flanges of the vehicle latch handle to restrain the position of the cover.

6. A semi truck door latch and cover comprising;
   a latch housing mounted to the door of a semi truck;
   a handle mounted for rotation within the housing about a single hinge pin, the handle having a hinge side edge, a front portion, an edge opposite the hinge side, and a back side, wherein the hinge pin is fixed to rotate with the handle, the hinge pin extending upwardly and downwardly through the housing to mount the handle for rotation on the housing;
   a portion of the hinge pin which extends through the housing having a camming arm mounted thereto for actuating a door opening mechanism;
   a one-piece, removable, resilient latch cover which wraps around the hinge side edge, the front portion, and the edge opposite the hinge side edge, and wraps that portion of the back side which is engaged by an operator's hand in operating the latch to rotate the hinge pin and the camming arm mounted thereto, the latch cover having a front plate which overlies the front protion, a lip which wraps the hinge side edge, a connector portion which wraps the edge opposite the hinge side edge, and a rear plate spaced rearwardly from the front plate which wraps the portion of the back side which is engaged by an operator's hand in operating the latch.

7. The assembly of claim 6 wherein the latch cover portion which wraps around the front portion of the handle comprises a front plate having an upper edge and a generally parallel lower edge, and wherein the vertical height of the side element of the lip is less than the vertical distance between the front plate upper edge and the front plate lower edge.

8. The assembly of claim 6 wherein the latch cover has a lip which includes a top element extending rearwardly and a bottom element extending rearwardly.

9. A semi truck door latch and cover comprising;
   a latch housing mounted to the door of a semi truck;
   a handle mounted for rotation within the housing about a single hinge pin, the handle having a hinge side edge, a front portion, an edge opposite the hinge side, and a back side, wherein the hinge pin is fixed to rotate with the handle, the hinge pin extending upwardly and downwardly through the housing to mount the handle for rotation on the housing;
   a portion of the hinge pin which extends through the housing having a camming arm mounted thereto for actuating a door opening mechanism;
   a one-piece, removable, resilient latch cover which wraps around the hinge side edge, the front portion, and the edge opposite the hinge side edge, and wraps that portion of the back side which is engaged by an operator's hand in operating the latch to rotate the hinge pin and the camming arm mounted thereto, wherein the latch cover portion which wraps the back side of the handle comprises a rear plate comprising:
      a center segment having an upper edge and a lower edge;
      a top wing extending upwardly and rearwardly from the upper edge; and
      a bottom wing extending downwardly and rearwardly from the lower edge, the top wing and the bottom wing acting to engage rearwardly extending flanges of the latch handle to restrain the position of the cover.

10. A unitary resilient cover for attachment to a semi truck latch handle, the cover comprising:
    a front plate positionable frontwardly of the latch handle;
    a rear plate positioned rearwardly of and parallel to the front plate and connected thereto by a connector segment, to thereby engage the latch handle between the front plate and the rear plate; and
    a side element which extends rearwardly from the front plate along an edge spaced from the connector segment, wherein the front plate is positionable to overlie the vehicle latch handle with the side element engaged with the latch handle, the cover being sufficiently resilient to permit temporary deformation when the cover is attached to the latch handle.

11. The cover of claim 10 wherein the front plate has an upper edge and a generally parallel lower edge, and wherein the vertical height of the lip is less than the vertical distance between the front plate upper edge and the front plate lower edge.

12. The cover of claim 10 wherein the lip includes a top element extending rearwardly from the front plate and a bottom element extending rearwardly from the front plate.

13. A unitary resilient cover for attachment to a semi truck latch handle, the cover comprising:
    a front plate positionable frontwardly of the latch handle;
    a rear plate positioned rearwardly of the front plate and connected thereto by a connector segment, to thereby engage the latch handle between the front plate and the rear plate; and
    a side element which extends rearwardly from the front plate along an edge spaced from the connector segment, wherein the front plate is positionable to overlie the vehicle latch handle with the side element engaged with the latch handle, the cover being sufficiently resilient to permit temporary deformation when the cover is attached to the latch handle, wherein the rear plate comprises:
       a center segment having an upper edge and a lower edge;
       a top wing extending upwardly and rearwardly from the upper edge; and
       a bottom wing extending downwardly and rearwardly from the lower edge, the top wing and the bottom wing acting to engage rearwardly extending flanges of the vehicle latch handle to restrain the position of the cover.

14. A cover for a vehicle latch handle having an axle pin, the cover comprising:
    a front plate which extends frontwardly of the latch handle;
    a rear plate positioned rearwardly of the front plate and connected thereto by a connector segment; and
    a clip which extends sidewardly from the rear plate, the clip having at least one sidewardly extending first tab positioned to engage with the axial pin of the latch handle, the tab being resilient to releasably engage the cover to the pin.

15. The cover of claim 14 wherein the cover clip tab is curved to open rearwardly.

16. The cover of claim 15 further comprising at least one sidewardly extending second tab, which is resilient, and which is curved to open frontwardly, such that the axle pin is engagable between the at least one first tab and the at least one second tab.

17. The cover of claim 14 further comprising an upper wing which extends upwardly from the rear plate, and a lower wing which extends downwardly from the rear plate.

18. The cover of claim 14 further comprising an entry element extending from the at least one first tab, the entry element being a strip of material folded back and away from the location of the axle pin, the entry element providing a curved cam like surface which assists the entry of the axle pin between the at least one first tab and front plate.

19. A semi truck door latch and cover comprising;
   a latch housing mounted to the door of a semi truck;
   a handle mounted for rotation within the housing about a single hinge pin, the handle having a hinge side edge, a front portion, an edge opposite the hinge side, and a back side, the hinge pin extending upwardly and downwardly through the housing to mount the handle for rotation on the housing;
   a one-piece, removable, resilient latch cover which has a front plate which extends over the front portion of the handle, a portion which wraps around the edge opposite the hinge side edge, and a rear plate that wraps that portion of the back side which is engaged by an operator's hand in operating the latch to rotate the hinge pin, wherein the cover has a resilient clip which extends sidewardly from the rear plate to engage the pin, and wherein the cover is restricted from sideward movement away from the pin by the clip, is restricted from sideward movement toward the clip by the portion which wraps around the edge opposite the hinge side edge, and is restricted from rotation about the pin by engagement between the front plate and the front portion of the handle.

20. The assembly of claim 19 wherein the clip has at least one sidewardly extending first tab positioned to engage with the axial pin of the latch handle, the tab being resilient to releasably engage the cover to the pin.

21. The cover of claim 20 further comprising at least one sidewardly extending second tab, which is resilient, and which is curved to open frontwardly, such that the axle pin is engagable between the at least one first tab and the at least one second tab.

22. The cover of claim 20 further comprising an entry element extending from the at least one first tab, the entry element being a strip of material folded back and away from the location of the axle pin, the entry element providing a curved cam like surface which assists the entry of the axle pin between the at least one first tab and front plate.

23. The cover of claim 19 further comprising an upper wing which extends upwardly from the rear plate, and a lower wing which extends downwardly from the rear plate.

* * * * *